(12) United States Patent
Balogh et al.

(10) Patent No.: US 10,976,427 B2
(45) Date of Patent: Apr. 13, 2021

(54) METHOD AND SYSTEM FOR MEASURING DISTANCE USING WAVE SIGNALS

(71) Applicant: POZI DEVELOPMENT KFT., Szekesfehervar (HU)

(72) Inventors: Andras Balogh, Fot (HU); Karoly Lendvai, Keszthely (HU); Kristof Attila Horvath, Budapest (HU); Gergely Ill, Tapioszecso (HU); Akos Milankovich, Szombathely (HU); Sandor Szabo, Budapest (HU)

(73) Assignee: PI Holding ZRT, Budapest (HU)

( * ) Notice: Subject to any disclaimer, the term of this patent is extended or adjusted under 35 U.S.C. 154(b) by 197 days.

(21) Appl. No.: 16/310,315

(22) PCT Filed: May 8, 2017

(86) PCT No.: PCT/HU2017/050014
§ 371 (c)(1),
(2) Date: Dec. 14, 2018

(87) PCT Pub. No.: WO2017/216590
PCT Pub. Date: Dec. 21, 2017

(65) Prior Publication Data
US 2019/0331788 A1 Oct. 31, 2019

(30) Foreign Application Priority Data

Jun. 15, 2016 (HU) .................................. P1600382

(51) Int. Cl.
*G01S 13/87* (2006.01)
*G01S 13/76* (2006.01)
(52) U.S. Cl.
CPC .......... *G01S 13/876* (2013.01); *G01S 13/765* (2013.01)

(58) Field of Classification Search
CPC .............................. G01S 13/876; G01S 13/765
(Continued)

(56) References Cited

U.S. PATENT DOCUMENTS 8,823,577 B2 * 9/2014 Smid ...................... G01S 13/46
342/42
2018/0356490 A1 * 12/2018 Van Den Dungen ...................... G01S 5/0221

OTHER PUBLICATIONS

PCT Preliminary Report on Patentability, PCT/HU2017/050014, dated Dec. 18, 2018 (Year: 2018).*

* cited by examiner

*Primary Examiner* — Frank J McGue
(74) *Attorney, Agent, or Firm* — Olson & Cepuritis, Ltd.

(57) ABSTRACT

The object of the invention relates to a method for measuring distance using wave signals (l1, l2, v), the essence of which is a first and a second transceiver device (E, M) suitable for emitting and receiving wave signals (l1, l2, v) are provided, a first sensing device (O') suitable for receiving wave signals (l1, l2, v) is arranged at a distance D' from one of the first and second transceiver devices (E, M), wave signals (l1, l2, v) are sent and received by the first and second transceiver devices (E, M), which are also received by the first sensing device (O'), then on the basis of the distance D', the time intervals (ΔE1E2, ΔM1M2, ΔO1'O2', ΔE2E3, ΔM2M3, ΔO2'O3') passing between the emitting and receipt of the wave signals (l1, l2, v) and the speed of propagation of the wave signals (l1, l2, v) the distance of the second transceiver device (M) from the first transceiver device (E), and the distance of the first sensing device (O') from the first and second transceiver devices (E, M) are determined. The object of the invention also relates to a system (100) for measuring distance using wave signals (l1, l2, v), which contains a first and second transceiver device (E, M) suitable (Continued)

Figure 2A:
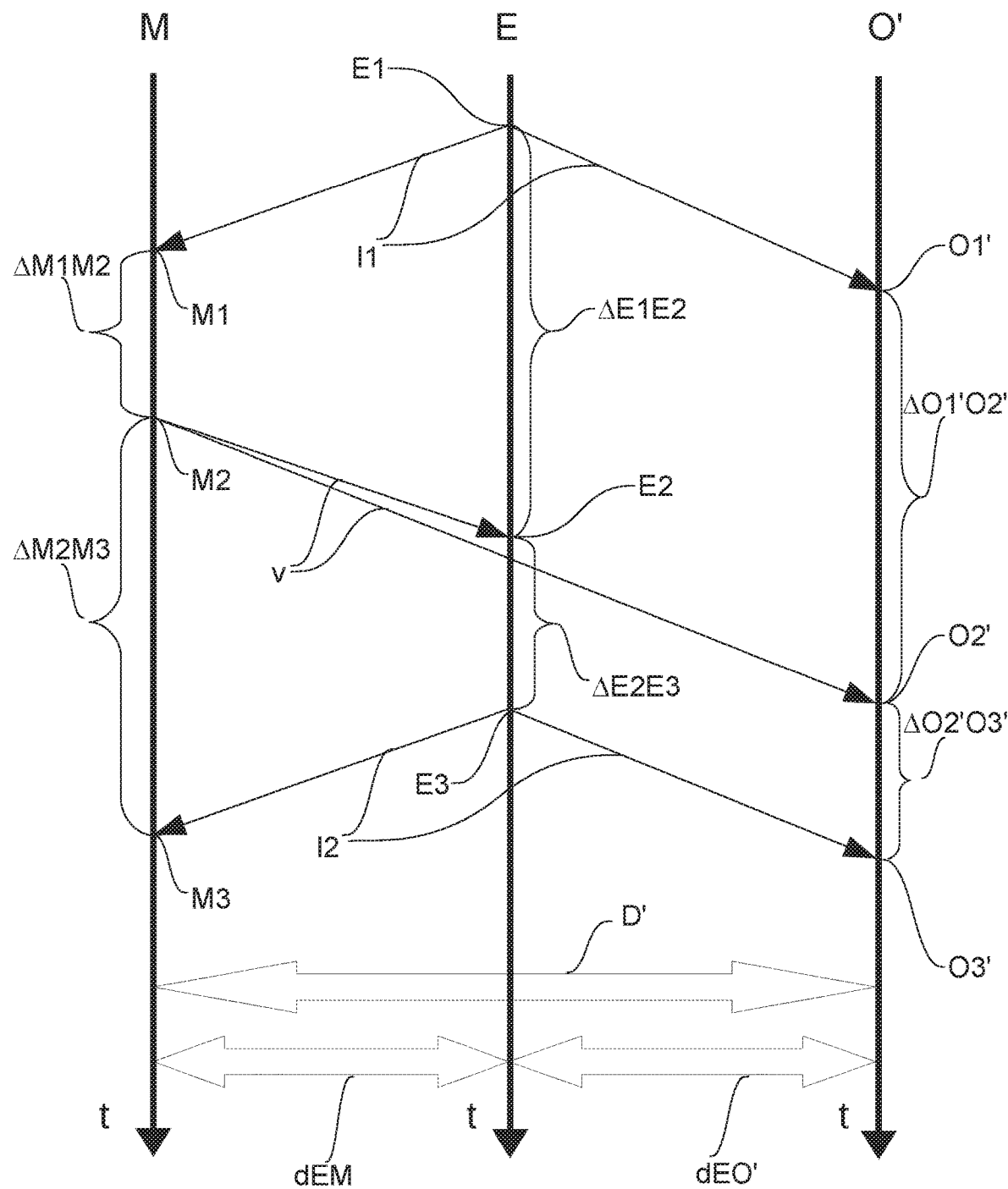

for emitting and receiving wave signals (I1, I2, v), as well as sensing devices (O', O'', O''') suitable for receiving wave signals (I1, I2, v) arranged at a distance D', D'', D''' from one of the first and second transceiver devices (E, M), the essence of which is that the first and second transceiver devices (E, M), and the sensing devices (O', O'', O''') are configured in a way suitable for implementing the method according to the invention.

16 Claims, 5 Drawing Sheets

(58) Field of Classification Search
USPC .......................................................... 342/125
See application file for complete search history.

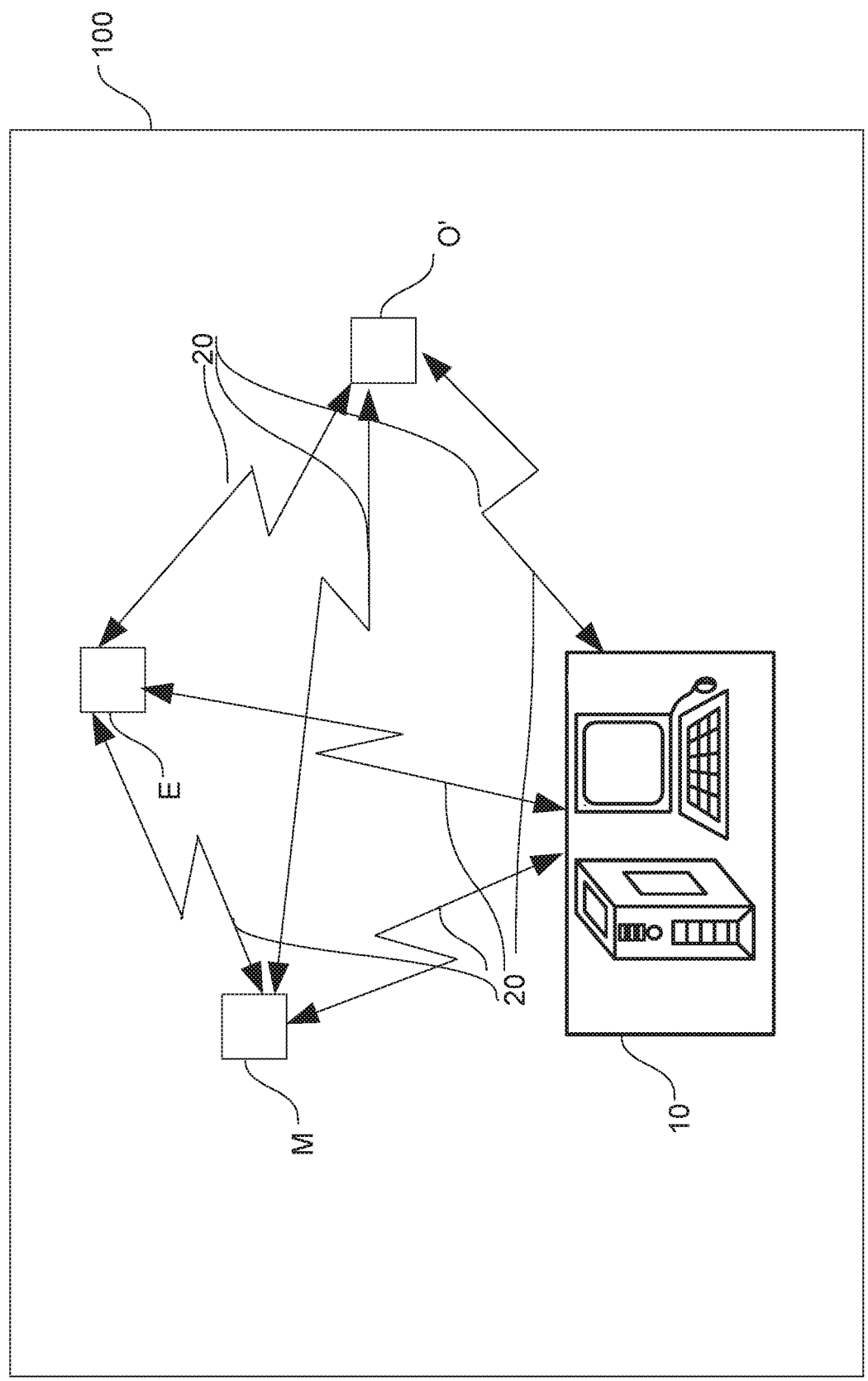

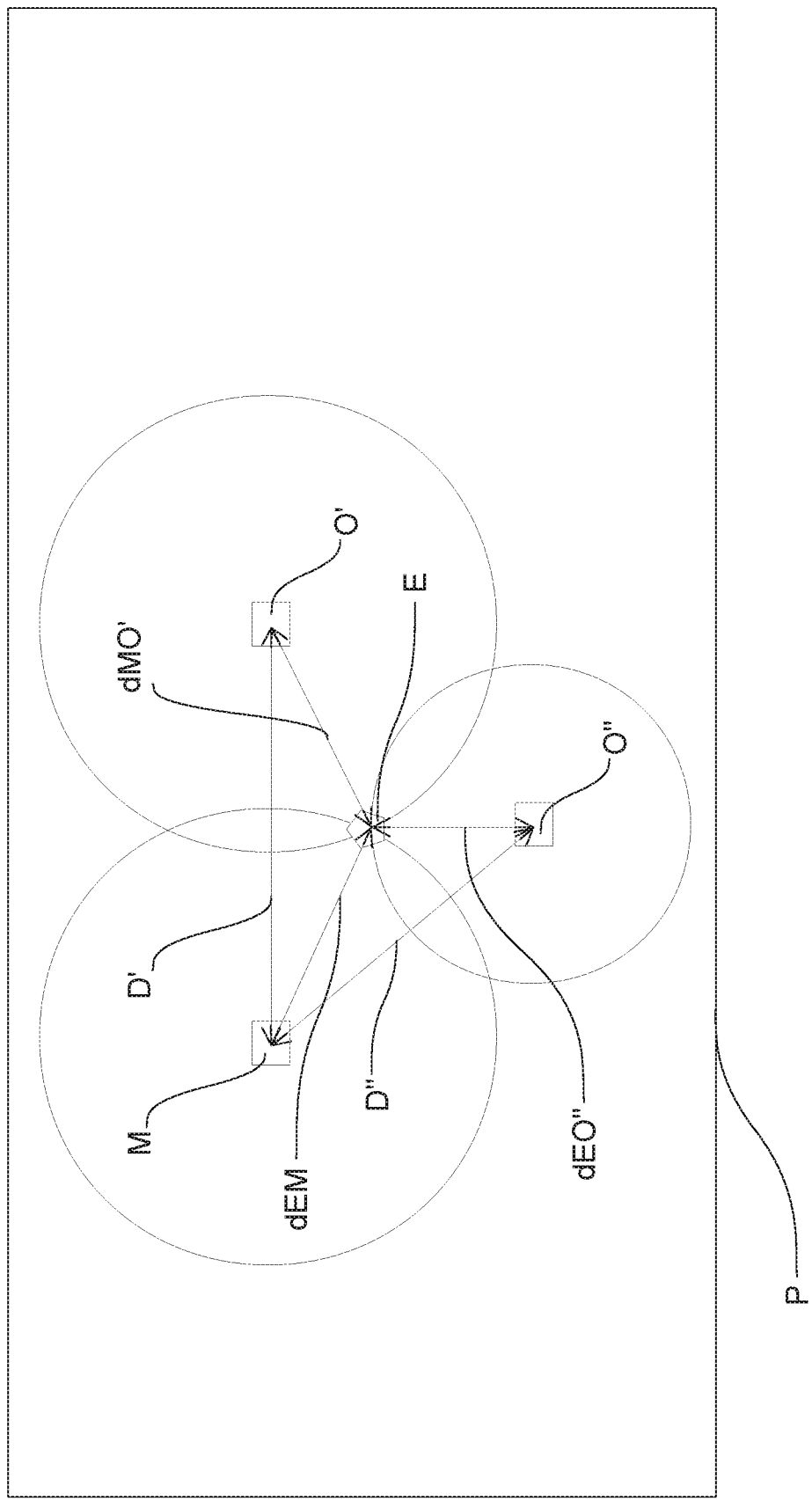

METHOD AND SYSTEM FOR MEASURING DISTANCE USING WAVE SIGNALS

CROSS-REFERENCE TO RELATED APPLICATIONS

This application is a U.S. National Stage of PCT/HU2017/050014, filed May 8, 2017, which claims priority of Hungarian Patent Application No. P1600382, filed Jun. 15, 2016, each of which is incorporated herein by reference.

The object of the invention relates to a method for measuring distance using wave signals.

The object of the invention also relates to a system for measuring distance using wave signals, which contains a first and second transceiver device suitable for emitting and receiving wave signals, as well as a sensing device suitable for receiving wave signals arranged at a distance from one of the first and second transceiver devices.

As a result of the development of communications technology numerous systems have been developed that are able to determine the position of an object (e.g. mobile device) using some sort of method.

Today one of the most widespread positioning systems is the Global Positioning System (GPS), which is a satellite navigation system operating anywhere on the Earth, 24 hours a day. 3-dimensional positioning is possible using GPS. The precision of positioning is characteristically of the order of a few metres, but using special methods precision of even a few millimetres can be achieved. The essence of the operation of GPS is that a receiver device measures the propagation time of the microwave signals emitted by the satellites orbiting the Earth, and so the position of the receiver device is determined in a given coordinate system.

The greatest disadvantage of GPS-based positing systems is that they can only be used in open, uncovered areas, and not indoors. A further disadvantage is that the receipt of the necessary data, and the detecting of the satellites may, in a given case, take a long time, furthermore signals reflected from buildings may corrupt the precision of positioning.

The above problems are also valid for the other satellite positioning systems (GLONASS, BeiDou).

In order to realise indoor positioning, solutions are known of from the state of the art that determine the relative position of an object by measuring the propagation time of electromagnetic waves, preferably radio waves.

One of the known methods of measuring distance based on signal propagation time using radio waves is the there-and-back sending of messages (two-way ranging). A first and a second transceiver device are required for the distance measuring method also appearing in the IEEE 802.15.4a standard. The first transceiver device sends an enquiry data packet to the second transceiver device, which it responds to with a response data packet. The time difference between the sending of the response data packet and the receipt of the enquiry data packet is optionally contained in the response data packet or, preferably, in a signal packet sent after the sending of the response data packet. The time difference between the sending of the enquiry data packet and the arrival of the response data packet is measured by the first transceiver device. On the basis of this the first transceiver device calculates the joint propagation time of the two packets. The distance between the two transceivers may be determined from the joint propagation time of the packages in the knowledge of the propagation speed of radio waves.

In order to successfully use the method it is necessary to be able to measure time with great precision. As the speed of propagation of radio waves is the same as the speed of light, time must be measured with nanosecond or sub-nanosecond precision in the interest of obtaining suitable positioning precision. The precision of the there-and-back message-sending method is fundamentally determined by the error in the measurement of the time difference between the receipt of the enquiry signal packet and the sending of the response signal packet, which is usually high. It is precisely because of this that the above method only makes low-precision distance measuring possible, and so it is rarely used in practice.

The error originating from the imprecision of time measurement may be reduced by not determining the distance between the transceiver devices with a single there-and-back exchange of packets, instead it is determined using smaller time intervals, in this way the error in measuring time causes a smaller error in the final result. The essence of this method is that after the first exchange of messages the first transceiver device sends a response signal packet to the second transceiver device, so both devices measure two time intervals each (three message exchange method). In the case of this method the precision of measurement will be fundamentally determined by the time difference between the response time of the first transceiver device and the response time of the second transceiver device, which results in an error that is orders of magnitude smaller than the error of the there-and-back message sending method. This method makes it possible to measure distances that can be used in practice. Its disadvantage, however, is that the sending of one more signal packet is necessary, which slows down the enquiry speed during positioning, therefore the possible number of positions that may be determined over a given unit of time drops.

In the interest of dearly being able to determine the 2-dimensional position of an object from the measured distances, the distance of the object as compared to three transceivers needs to be known. If the 3-dimensional (spatial) position of an object must be determined, the distance of the object as compared to at least four transceiver devices must be determined. It may be seen then that for 2-dimensional positioning, in the case of the there-and-back message sending method it is necessary to exchange 6 signal packets, and in the case of the three message exchange method, it is necessary to exchange 9 signal packets.

Regularly emission of signals is energy demanding, therefore continuously ensuring the power supply to the transceiver devices, especially in the case of transceiver devices containing a built-in power source, may represent a problem. In the case of a system consisting of many transceiver devices periodically replacing the batteries may be laborious and costly.

It has been realized that if during the three-message exchange method the signal packets sent by the first and second transceiver devices are intercepted using further transceiver devices, then with just three message exchanges the distance of the second transceiver device from the first transceiver device, and the distance of the further transceiver devices from the first and second transceiver devices may be determined with great precision, in other words more precise planar and/or spatial positioning may be realised with fewer message exchanges than the previous solutions.

It has been also realized that receiver devices are sufficient to monitor the signal packets sent by the first and second transceiver devices, which are simpler and cheaper that transceiver devices, therefore the positioning system according to the method may be constructed at a relatively low cost.

The objective of the invention is to provide a method and system for measuring distance that is free of the disadvantages of the solutions according to the state of the art. The aim of the invention is especially to create a method and system for measuring distance with which planar and/or spatial positioning may be realised with greater precision than the solutions according to the state of the art with fewer message exchanges.

The invention is based on the recognition that during the three message exchange method the signal packets sent by the first and second transceiver devices are monitored using further transceiver devices, then with just three message exchanges, not only can the distance of the second transceiver device from the first transceiver device bet determined with great precision, but also the distance of the further transceiver devices from the first and second transceiver devices can be determined with great precision.

The task in accordance with the invention was solved with the method according to claim 1, and with the system according to claim 15.

Further advantageous embodiments of the invention are defined in the attached dependent claims.

Figure 2B:
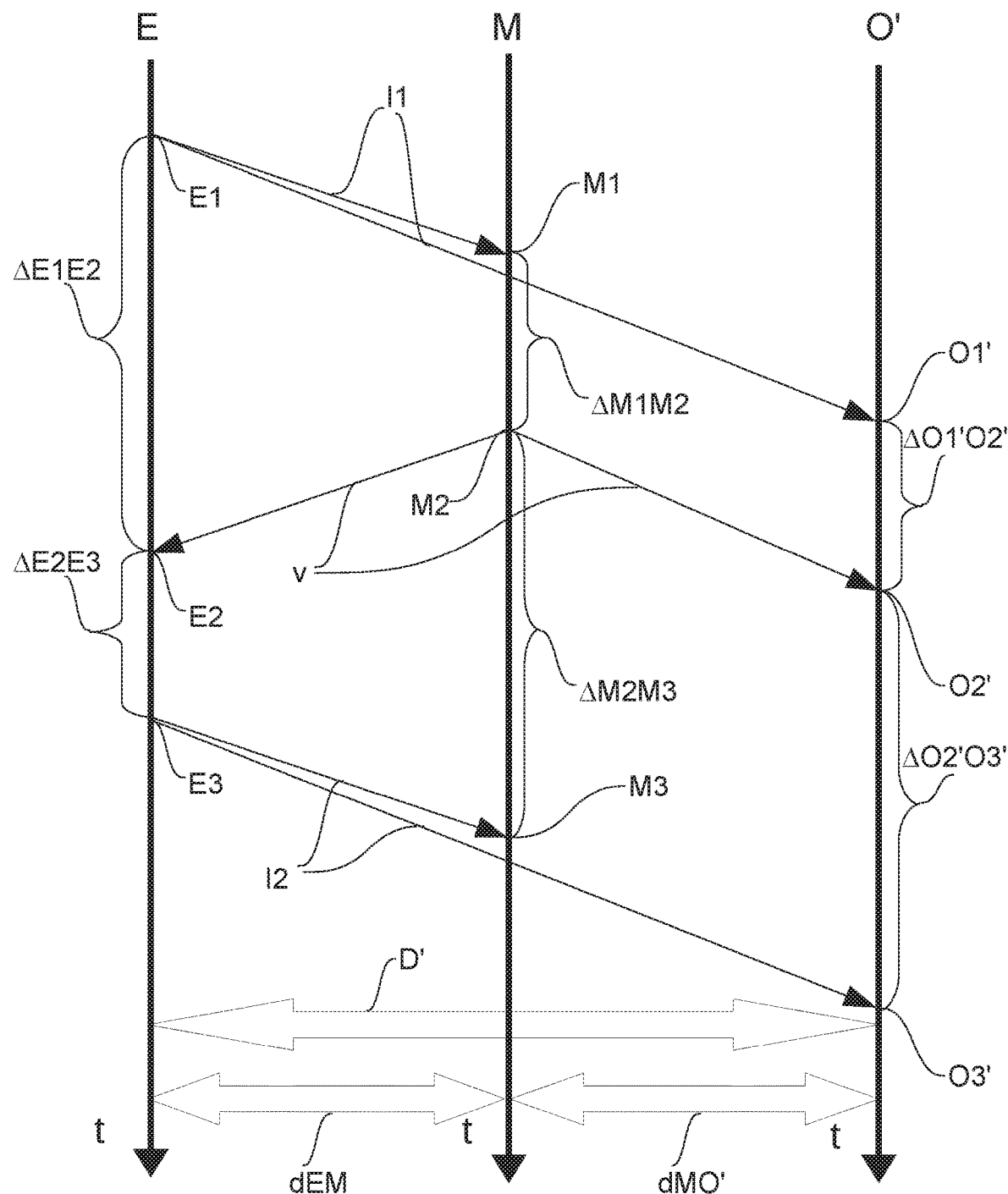
Figure 3B:
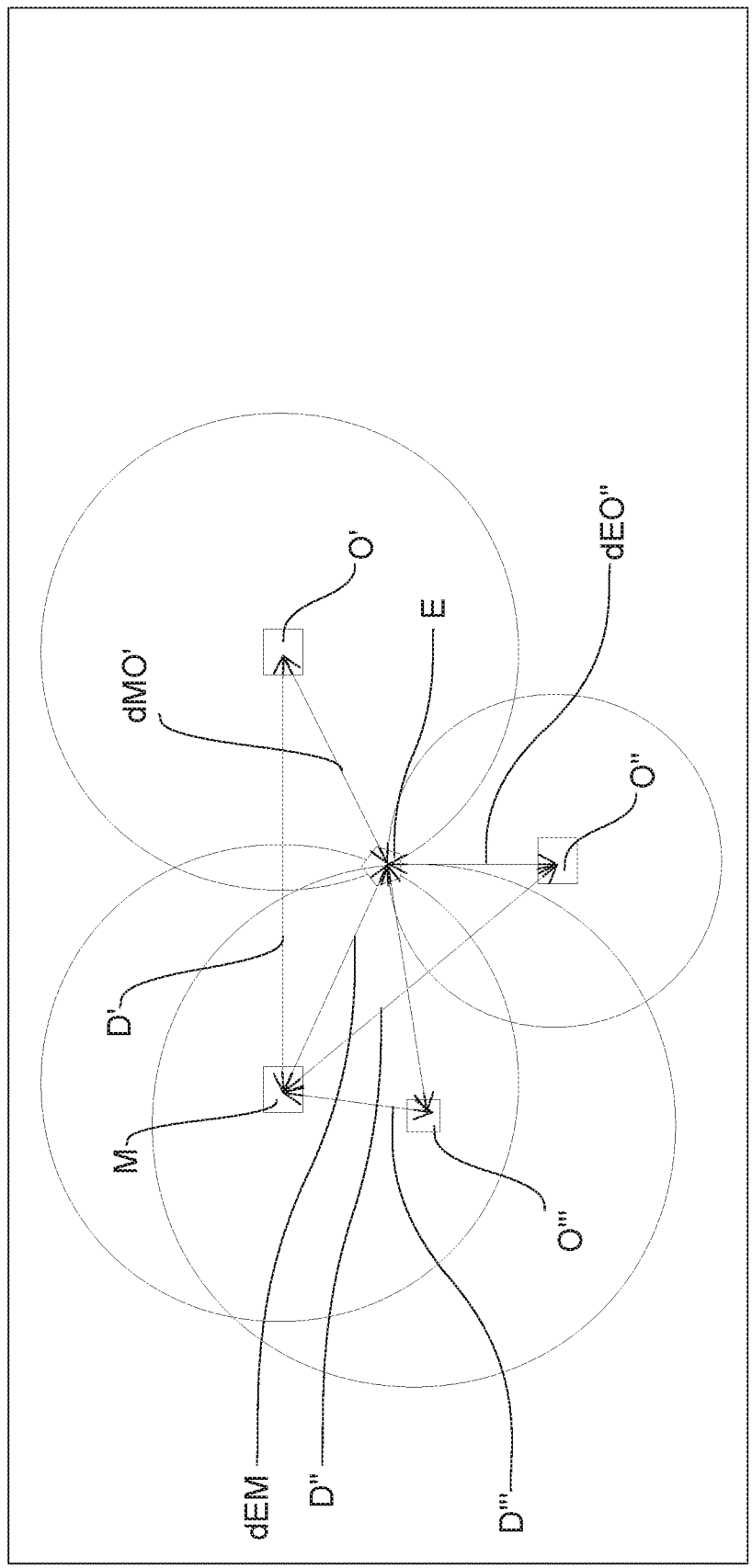

Further details of the invention will be explained by way of exemplary embodiments with reference to the figures, wherein FIG. 1 is a schematic view of the main elements participating in a possible embodiment of the method according to the invention, a FIG. 2a is a flowchart of a possible embodiment of the method according to the invention, FIG. 2b is a flowchart of another possible embodiment of the method according to the invention, FIG. 3a is a section view taken in the plane P presenting the 2-dimensional case of positioning based on distance measurement, FIG. 3b is a plane section presenting the 3-dimensional case of positioning based on distance measurement.

FIG. 1 shows a schematic view of the main elements participating in a possible embodiment of the method for measuring distance according to the invention. In the case of the method according to the invention a first transceiver device E and a second transceiver device M are provided that are suitable for transmitting and receiving wave signals. In the context of the present invention transmitting and generating wave signals means the creation of the wave signal and the transmission of the wave signal simultaneous with its creation. In other words, in the context of the present invention, generation and transmission of the wave signal are used as synonyms. Wave signal is primarily understood to mean an electromagnetic wave (or wave packet), but the concept of wave signal also includes transverse and longitudinal waves propagated in various media (such as sound waves). The transceivers E, M may be any communication devices capable of receiving and generating wave signals (such as UWB transceiver, ultrasound transceiver, microcontroller supplied with a transceiver, or other dedicated hardware) that are capable of measuring the time passing between the receipt of the wave signals and the generation of the wave signals, processing the wave signals and of forwarding the measured time data in a wired or wireless manner.

A first sensing device O' suitable for receiving wave signals is arranged at a distance D' from one of the first and second transceiver devices E, M. The first sensing device O' is a combination of hardware and software elements that is suitable for measuring the time passing between the receipt of consecutive wave signals, and for forwarding the measured data in a wired or wireless manner. Optionally, an embodiment is conceivable in the case of which the first sensing device O' is not only suitable for receiving wave signals, but also for generating them. In this case the first sensing device O' may be established as a device identical to the transceiver devices E, M.

The arrangement of the first sensing device O' at the distance D' is understood to mean that the first sensing device O' is located at a known, and preferably fixed distance D' from the one of the first and second transceiver devices E, M.

Preferably a central information technology unit 10 connected to the transceiver devices E, M and the first sensing device O' via an electronic communication channel 20 also participates in the method according to the invention. The electronic communication channel may be created, for example, within the framework of an electronic communication network, which may be, for example, a wired or wireless local information technology network (local area network, LAN), or a global information technology network, especially the Internet, also a 3G or 4G standard-based mobile telecommunication network, GSM network, satellite communication network, etc., or a combination of these. The connection of the transceiver devices E, M and the first sensing device O' to the central information technology unit 10 is naturally not only understood as a direct connection, but also as an indirect connection, for example when the transceiver device E, M is connected to the central information technology unit 10 via another transceiver device E, M or via the sensing device O'.

The wired data transmission connection may be realised, for example, with the RS485 electronic standard, and the wireless connection may be ensured, for example, with the use of the Bluetooth and ZigBee protocols, as is obvious for a person skilled in the art. In the case of the present invention the concept of the central information technology unit 10 has a wide interpretation, which includes any hardware and software device suitable for receiving, storing and sending data, such as a desktop computer, laptop, system on chip (SoC), microcontroller, mobile communication devices (smartphone, tablet), dedicated hardware, etc., as is known to a person skilled in the art.

In the first step of the method according to the invention a first enquiry wave signal I1 is generated using the first transceiver device E at the time E1. The time of generation is preferably understood to mean the starting moment of generation or the completion moment of generation. The wave signal I1 is preferably an electromagnetic wave, even more preferably an ultra-wideband radio signal, the centre frequency and bandwidth of which fall in the gigahertz range. During the use of the ultra-wideband radio signal short duration signals (impulses) are generated, which are different to traditional carrier modulated technologies.

In the second step of the method according to the invention the first enquiry wave signal I1 generated by the first transceiver device E is received by the second transceiver device M at the time M1 following the time E1, and by the first sensing device O' at the time O1' following the time E1. If the time of the generation of the wave signal is understood as meaning the starting moment of generation, then preferably the time of the receipt of the wave signal is understood as meaning the starting moment in time of receipt. If the time of the generation of the wave signal is understood as meaning the completion moment of generation, then preferably the time of the receipt of the wave signal is understood as meaning the completion moment of receipt.

In the next step of the method a response wave signal v is generated with the second transceiver device M in the time M2 following the time M1 by the time interval ΔM1M2, and the time interval ΔM1M2 is determined. The determination of the time interval ΔM1M2 is understood to mean its direct measurement, or, for example, its subsequent calculation based on the moments in time M1 and M2. Optionally, an embodiment is conceivable in the case of which the transceiver device is set up in such a way that when receiving an enquiry wave signal it sends a response wave signal after a determined and known period of time has passed. In the case of this embodiment the time interval between the receipt of the enquiry wave signal and the generation of the response wave signal is a predetermined, known value, therefore it is not necessary to separately measure this.

In the next step of the method the response wave signal v generated by the second transceiver M at the time M2 is received by the first transceiver device at the time E2 following the time E1 by the time interval ΔE1E2, and the time interval ΔE1E2 is determined by the first transceiver device E.

The response wave signal v generated by the second transceiver device M at the time M2 is also received by the first sensing device O' at the time O2' following the time O1' by the time interval ΔO1'O2', then the time interval ΔO1'O2' is determined with the first sensing device O'.

In the next step a second enquiry wave signal I2 is generated using the first transceiver device E at the time E3 following the time E2 by the time interval ΔE2E3, and the time interval ΔE2E3 is determined. The determination of the time interval ΔE2E3 may take place, for example, according to that described in the case of the determination of the time interval ΔM1M2. The enquiry wave signal I2 is received by the second transceiver device M at the time M3 following the time M2 by the time interval ΔM2M3. The time interval ΔM2M3 is determined by measuring the time elapsed between the time M2 of the emission of the response wave signal v and the receipt of the second enquiry wave signal I2.

The wave signal I2 generated by the first transceiver device E at the time E3 is also received by the first sensing device O' at the time O3' following the time O2' by the time interval ΔO2'O3', then the time interval ΔO2'O3' is determined using the first sensing device O'.

On the basis of the knowledge of the distance D', the time intervals ΔE1E2, ΔM1M2, ΔO1'O2', ΔE2E3, ΔM2M3, ΔO2'O3' and the speed of propagation of the wave signals I1, I2, and v, the distance dEM of the second transceiver device M from the first transceiver device E, and the distance dEO' of the first sensing device O' from the first transceiver device E and the distance dMO' of the first sensing device O' from the second transceiver device M are determined. The details of the determination of the distances dEM, dEO', and dMO' are explained in the following.

FIG. 2a depicts a flow chart of a possible embodiment of the method according to the invention. The vertical axes illustrate the passing of time. In the case of this embodiment the second transceiver device M is arranged at a known and preferably fixed distance D' from the first sensing device O'. In the case of an especially preferable embodiment the positions of the second transceiver device M and the first sensing device O' in an absolute reference system are also known. Such a reference system may be fixed to buildings or to outdoor areas, etc., for example.

Using the method according to the invention the distance of the first transceiver device E, which can freely move as compared to the second transceiver device M and the first sensing device O', from the second transceiver device M and the first sensing device O' is determined. Therefore in the case of this embodiment the second transceiver device M will operate as a positioning device, while the first transceiver device E will operate as a positioned device. The determination of the distances takes place in the following way.

The values of the time intervals ΔE1E2, ΔM1M2, ΔO1'O2', ΔE2E3, ΔM2M3, and ΔO2'O3' and/or the data required to determine them (e.g. the time values E1, E2, E3, M1, M2, M3, O1', O2', O3') are sent to the central information technology 10 device using the first transceiver device E, the second transceiver device M and the first sensing device O'. In addition to the time intervals ΔE1E2, ΔM1M2, ΔO1'O2', ΔE2E3, ΔM2M3, and ΔO2'O3', identification data are also sent to the central information technology device 10, with which it may be clearly determined which device E, M, O' the time intervals ΔE1E2, ΔM1M2, ΔO1'O2', ΔE2E3, ΔM2M3, and ΔO2'O3' originate from.

Using the central information technology unit 10 the distance dEM of the first transceiver device E from the second transceiver device M is preferably determined using the following formula $$dEM = \frac{\Delta E1E2 - \Delta M1M2 + \Delta M2M3 - \Delta E2E3}{4}c$$

In the above formula c is the speed of propagation of the wave signals I1, I2, v, which in the case of the use of ultra-wideband radio signals is equal to the speed of light. It should be noted that as the first transceiver device E may move as compared to the second transceiver device M and the first sensing device O', the distances dEM, dEO' are always understood as being momentary distances. As, however, the speed of propagation of the wave signals I1, I2, v is greater by many orders of magnitude than the speed of the first transceiver device E as compared to the second transceiver device M and the first sensing device O', therefore any possible displacement of the first transceiver device E does not significantly influence the precision of the method according to the invention.

The distance of the first transceiver device E from the first sensing device O' is determined using the central information technology unit 10 preferably with the formula $$dEO' = dEM + D + \left(\frac{\Delta O1'O2' - \Delta O2'O3'}{2} - \frac{\Delta E1E2 - \Delta E2E3}{2}\right)c$$

making use of the known distance D' of the second transceiver device M and of the first sensing device O'.

Optionally, an embodiment is conceivable in which the values of the time intervals ΔE1E2, ΔM1M2, ΔO1'O2', ΔE2E3, ΔM2M3, ΔO2'O3' and/or the data required to determine them are not sent to the central information technology unit 10, but to the first transceiver device E instead, and the distances dEM and dEO' are calculated by the first transceiver device E itself. So in the case of this embodiment, the central information technology unit 10 may be left out.

On the basis of simple geometric considerations in the case of positioning based on distance measurement it is necessary to know the distance of the object from 3 objects with known positions in order to clearly determine any 2-dimensional position of an object. And in order to clearly determine any 3-dimensional position of the object it is necessary to know its distance from 4 objects with known positions. In the context of the present invention the 2-dimensional position of an object is understood to mean its position within a determined plane, and 3-dimensional position is understood to mean the object's spatial position.

In the following a possible practical example of 2-dimensional positioning performed with the method according to the invention is presented with the help of FIG. 3a.

In addition to the first sensing device O' arranged at a distance D' from the second transceiver device M with known position, a second sensing device O" with known position arranged at a distance D" from the second transceiver device M is provided. It should be noted that FIG. 3a is a schematic view, serving only for illustration, and the second transceiver device M and the sensing devices O', O" are not necessarily in the plane of FIG. 3a.

The known positions of the second transceiver device M and of the sensing devices O', O" is understood to mean that at least their positions as compared to each other are known. In the case of this embodiment the first transceiver device E is capable of moving in the first plane P with known and fixed position as compared to the second transceiver device M and the sensing devices O', O". The first plane P may be, for example, the plane of a floor of a building, or a plane parallel with this, in which the first transceiver device E moves. The fixed position of the first plane P is understood to mean that the second transceiver device M and the sensing devices O', O" are arranged at a constant and known distance from the first plane P (such as from the floor plane of a building), or are arranged in the first plane P.

In the following step the distance dEM of the first transceiver device E from the second transceiver device M, the distance dEO' of the first transceiver device E from the first sensing device O', and the distance dEO" of the first transceiver device E from the second sensing device O" are determined.

On the basis of the distances dEM, dEO', and dEO" the 2-dimensional first planar position in the fixed-position first plane P of the first transceiver device from the second transceiver device M and the sensing devices O', O" is determined as follows. By determining the distance dEM the position of the first transceiver device E may be located anywhere along the circumference of a circle created by intersecting a sphere with radius dEM and with the second transceiver device M at its centre-point with the first plane P. It is to be noted that in the first special case when the second transceiver device M is not in the first plane P, and the first transceiver device E may be found at the point of the first plane P closest to the second transceiver device M, the first plane P and the sphere with radius dEM come into contact at one point, and in this case knowledge of the distance dEM is sufficient in itself to clearly determine the 2-dimensional position of the first transceiver device E.

After the distance of the first transceiver device E from the sensing device O' has been determined, the position of the first transceiver device E becomes partly known in respect of the two points created through the intersection of the circle mentioned above and a sphere with radius dEO' with the sensing device O' at its centre-point under the assumption that the second transceiver device M and the sensing device O' are not arranged on a single straight line normal to the first plane P.

In order to clearly determine the position of the first transceiver device E on the first plane P knowledge of at least the distance dEO" is also required. Disregarding the special arrangement when the first plane P is normal to the plane determined by the second transceiver device M and the sensing devices O', O", the sphere with radius dEO" only goes through the one of the two points determined by the intersection of the spheres with radii dEM, dEO' and the first plane P, due to this the position of the first transceiver device E on the first plane P is clearly designated.

In the case of the embodiment illustrated in FIG. 3b, in order to determine any 3-dimensional spatial position of the first transceiver device E a third sensing device (O''') with known position arranged at a distance D''' from the second transceiver device M is provided in addition to the first and second sensing devices O', O". It should be noted that in the special case when the first transceiver device E is located on a straight line passing through any two of the second transceiver device M, the first sensing device O' and the second sensing device O", then the position of the first transceiver device E may be clearly determined in the knowledge of any appropriate two distances dEM, dEO', and dEO". Furthermore, in the special case when the first transceiver device E is located on the plane passing through the second transceiver device M and the sensing devices O', O", then in the knowledge of the distances dEM, dEO', dEO" the spatial position of the first transceiver device E may be clearly determined.

With the exception of the above special cases, it is necessary to know the distance dEO''' in order to clearly determine the 3-dimensional spatial position of the first transceiver device E. The sphere with radius dEO''' only passes through one of the two points determined by the intersection of the spheres with radii dEM, dEO', dEO", thereby clearly determining the real spatial position of the first transceiver device E.

In the case of an especially preferable embodiment, the sensing devices O', O", O''' are not only suitable for receiving wave signals, they are also suitable for emitting wave signals. The advantage of this is that if as a result of displacement the first transceiver device E and the second transceiver device M fall out of each other's range, in other words because of their distance they are unable to send and receive the wave signals I1, I2, v between each other, or the signal strength falls under a certain level, then that sensing device O', O", O''' that has got into the vicinity of the first transceiver device E (in other words, within its range) is able to function as a second transceiver device M. This may be realised, for example, in such a way that the central information technology unit 10 continuously or intermittently monitors the second transceiver device M and the sensing devices O', O", O''', and on the basis of the time of the arrival of the wave signals I1, I2 sent by the first transceiver device E it allocates which of the second transceiver device M and the sensing devices O', O", O''' will function as the second transceiver device M, in other words which will send the response signal v to the first transceiver device E.

In the case of the embodiments presented above the distance and position of the first transceiver device E emitting the first enquiry wave signal I1 were determined. The embodiment of the method according to the invention visible in FIG. 2b deviates from the embodiments presented above in that it is not the second transceiver device M but the first transceiver device E that is arranged at known distances D', D", D''' from the sensing devices O', O", O''', and during the method, the distances of the second transceiver device M, i.e. distance dEM from the first transceiver device, dMO' from the first sensing device O', distance dMO" from the sensing device O", and distance dMO''' from the sensing device O''' are determined in a way analogous to that presented above. Finally using the distances dEM, dMO', dMO", and dMO''' the 2-dimensional position on the first plane P and the 3-dimensional spatial position of the second transceiver device M are determined in accordance with that presented previously.

The object of the invention also relates to a distance measuring system 100 serving for implementing the method for measuring distance according to the invention, which contains first and second transceiver devices E, M suitable for emitting and receiving the wave signals I1, I2, v, and sensing devices O', O", O'" suitable for receiving the wave signals I1, I2, v and arranged at a distance D', D", D'" from one of the first or second transceiver devices E, M.

Preferably the system 100 comprises a central information technology unit 10 in wired and/or wireless connection with the first transceiver device E, the second transceiver device M and the sensing devices O', O", O'".

Various modification to the embodiments disclosed above will be apparent to a person skilled in the art without departing from the scope of protection determined by the attached claims.

The invention claimed is:

1. Method for measuring distance using wave signals (I1, I2, v), characterised by
    providing a first and a second transceiver device (E, M) suitable for emitting and receiving wave signals (I1, I2, v),
    arranging a first sensing device (O') suitable for receiving wave signals (I1, I2, v) at a distance D' from a first one of the first and second transceiver devices (E, M),
    determining a first distance of the second transceiver device (M) from the first transceiver device (E) and determining a second distance of the second one of the of the first and second transceiver devices (E, M) from the first sensing device (O') by:
        generating a first enquiry wave signal (I1) using the first transceiver device (E) at time E1,
        receiving the first enquiry wave signal (I1) generated by the first transceiver device (E) by the second transceiver device (M) at time M1 following the time E1,
        receiving the first enquiry wave signal (I1) generated by the first transceiver device (E) by the first sensing device (O') at time O1' following the time E1,
        generating a response wave signal (v) by the second transceiver device (M) at time M2 following the time M1 by a time interval ΔM1M2,
        receiving the response wave signal (v) generated by the second transceiver device (M) at time M2 by the first transceiver device (E) at time E2 following the time E1 by the time interval ΔE1E2,
        receiving the response wave signal (v) generated by the second transceiver device (M) at time M2 by the first sensing device (O') at time O2' following the time O1' by the time interval ΔO1'O2',
        generating a second enquiry wave signal (I2) by the first transceiver device (E) at time E3 following the time E2 by the time interval ΔE2E3,
        receiving the second enquiry wave signal (I2) generated by the first transceiver device (E) at time E3 by the second transceiver device (M) at time M3 following the time M2 by the time interval ΔM2M3,
        receiving the second enquiry wave signal (I2) generated by the first transceiver device (E) at time E3 by the first sensing device (O') at time O3' following the time O2' by the time interval ΔO2'O3', and
        using the distance D', and the time intervals ΔE1E2, ΔM1M2, ΔO1'O2', ΔE2E3, ΔM2M3, ΔO2'O3' and the speed of propagation of the wave signals (I1, I2, v) to determine the first distance of the second transceiver device (M) from the first transceiver device (E), and the second distance of the first sensing device (O') from the second one of the first and second transceiver devices (E, M).

2. Method according to claim 1, characterised by providing a central information technology unit (10) connected to the first transceiver device (E), the second transceiver device (M) and the first sensing device (O') via an electronic communication channel (20), and using the first transceiver device (E), the second transceiver device (M) and the first sensing device (O') to send the values of the time intervals ΔE1E2, ΔM1M2, ΔO1'O2', ΔE2E3, ΔM2M3, ΔO2'O3' and/or the data required to determine them through the electronic communication channel to the central information technology unit (10), and determining the first distance of the second transceiver device (M) from the first transceiver device (E), and the second distance of the sensing device from the second one of the first and second transceiver devices (E, M) using the central information technology unit (10) on the basis of the distance D', and the time intervals ΔE1E2, ΔM1M2, ΔO1'O2', ΔE2E3, ΔM2M3, ΔO2'O3'.

3. Method according to claim 1, characterised by that the first distance dEM of the first transceiver device (E) from the second transceiver device (M) is determined using the following formula $$dEM = \frac{\Delta E1E2 - \Delta M1M2 + \Delta M2M3 - \Delta E2E3}{4} c$$

where c is the speed of propagation of the wave signals (I1, I2, v).

4. Method according to claim 3, characterised by that the first of the first and second transceiver devices (E, M) is the second transceiver device (M) and the first sensing device (O') is arranged at the distance D' from the second transceiver device (M).

5. Method according to claim 4, characterised by that the second distance dEO' of the first transceiver device (E) from the first sensing device (O') is determined using the following formula $$dEO' = dEM + D' + \left( \frac{\Delta O1'O2' - \Delta O2'O3'}{2} - \frac{\Delta E1E2 - \Delta E2E3}{2} \right) c.$$

6. Method according to claim 4, characterised by that
    arranging a second sensing device (O") suitable for receiving wave signals (I1, I2, v) at a distance D" from the second transceiver device (M),
    receiving the first enquiry signal (I1) generated by the first transceiver device (E) by the second sensing device (O") at time O1" following the time E1,
    receiving the response wave signal (v) generated by the second transceiver device (M) at time M2 by the second sensing device (O") at time O2" following the time O1" by the time interval ΔO1"O2",
    receiving the second enquiry wave signal (I2) generated by the first transceiver device (E) at time E3 by the second sensing device (O") at time O3" following the time O2" by the time interval ΔO2"O3", and
    determining a distance dEO" of the first transceiver device (E) from the second sensing device (O") using the following formula $$dEO'' = dEM + D'' + \left(\frac{\Delta O1''O2'' - \Delta O2''O3''}{2} - \frac{\Delta E1E2 - \Delta E2E3}{2}\right)c$$

and determining the position of the first transceiver device (E) in a first plane (P) with constant and known position from the second transceiver device (M) and the sensing devices (O', O") using the distances dEM, dEO', and dEO".

7. Method according to claim 4, characterised by that arranging a second sensing device (O") suitable for receiving wave signals (l1, l2, v) at a distance D" from the second transceiver device (M), arranging a third sensing device (O'") suitable for receiving wave signals (l1, l2, v) at a distance D'" from the second transceiver device (M), receiving the first enquiry wave signal (l1) generated by the first transceiver device (E) by the second sensing device (O") at time O1" following the time E1, receiving the first enquiry wave signal (l1) generated by the first transceiver device (E) by the third sensing device (O'") at time O1'" following the time E1, receiving the response wave signal (v) generated by the second transceiver device (M) at time M2 by the second sensing device (O") at time O2" following the time O1" by the time interval ΔO1"O2", receiving the response wave signal (v) generated by the second transceiver device (M) at time M2 by the third sensing device (O'") at time O2'" following the time O1'" by the time interval ΔO1"O2'", receiving the second enquiry wave signal (l2) generated by the first transceiver device (E) at time E3 by the second sensing device (O") at time O3" following the time O2" by the time interval ΔO2"O3", and receiving the second enquiry wave signal (l2) generated by the first transceiver device (E) at time E3 by the third sensing device (O') at time O3'" following the time O2'" by the time interval ΔO2'O3", and determining a distance dEO" of the first transceiver device (E) from the second sensing device (O") using the following formula $$dEO'' = dEM + D'' + \left(\frac{\Delta O1''O2'' - \Delta O2''O3''}{2} - \frac{\Delta E1E2 - \Delta E2E3}{2}\right)c$$

and determining the distance dEO'" of the first transceiver device (E) from the third sensing device (O'") using the following formula $$dEO''' = dEM + D''' + \left(\frac{\Delta O1'''O2''' - \Delta O2'''O3'''}{2} - \frac{\Delta E1E2 - \Delta E2E3}{2}\right)c$$

and and determining the 3-dimensional spatial position of the first transceiver device (E) using the distances dEM, dEO', dEO" and dEO'".

8. Method according to claim 3, characterised by that the first of the first and second transceiver devices (E, M) is the first transceiver device (E) and arranging the first sensing device (O') at a distance D' from the first transceiver device (E).

9. Method according to claim 8, characterised by determining the second distance dMO' of the second transceiver device (M) from the first sensing device (O') using the following formula $$dMO' = dEM + D' + \left(\frac{\Delta O1'O2' - \Delta O2'O3'}{2} - \frac{\Delta E1E2 - \Delta E2E3}{2}\right)c.$$

10. Method according to claim 8, characterised by that arranging a second sensing device (O") suitable for receiving wave signals (l1, l2, v) at a distance D" from the first transceiver device (E), receiving the first enquiry signal (l1) generated by the first transceiver device (E) by the second sensing device (O") at time O1" following the time E1, receiving the response wave signal (v) generated by the second transceiver device (M) at time M2 by the second sensing device (O") at time O2" following the time O1" by the time interval ΔO1"O2", receiving the second enquiry wave signal (l2) generated by the first transceiver device (E) at time E3 by the second sensing device (O") at time O3" following the time O2" by the time interval ΔO2"O3", and determining a distance dMO" of the second transceiver device (M) from the second sensing device (O") using the following formula $$dMO'' = dEM + D'' + \left(\frac{\Delta O1''O2'' - \Delta O2''O3''}{2} - \frac{\Delta E1E2 - \Delta E2E3}{2}\right)c$$

and determining the position of the second transceiver device (M) in a first plane (P) with constant and known position from the first transceiver device (E) and the sensing devices (O', O") using the distances dEM, dMO', and dMO".

11. Method according to claim 8, characterised by that arranging a second sensing device (O") suitable for receiving wave signals (l1, l2, v) at a distance D" from the first transceiver device (E), arranging a third sensing device (O'") suitable for receiving wave signals (l1, l2, v) at a distance D'" from the first transceiver device (E), receiving the first enquiry wave signal (l1) generated by the first transceiver device (E) by the second sensing device (O") at time O1" following the time E1, receiving the first enquiry wave signal (l1) generated by the first transceiver device (E) by the third sensing device (O'") at time O1'" following the time E1, receiving the response wave signal (v) generated by the second transceiver device (M) at time M2 the second sensing device (O") at time O2" following the time O1" by the time interval ΔO1"O2", receiving the response wave signal (v) generated by the second transceiver device (M) at time M2 by the third sensing device (O'") at time O2'" following the time O1'" by the time interval ΔO1"O2'", receiving the second enquiry wave signal (l2) generated by the first transceiver device (E) at time E3 by the second sensing device (O") at time O3" following the time O2" by the time interval ΔO2"O3", and receiving the second enquiry wave signal (l2) generated by the first transceiver device (E) at time E3 by the third sensing device (O') at time O3''' following the time O2'''
by the time interval ΔO2'O3'', and determining a distance dMO'' of the second transceiver device (M) from the second sensing device (O'') using the following formula $$dMO'' = dEM + D'' + \left(\frac{\Delta O1''O2'' - \Delta O2''O3''}{2} - \frac{\Delta E1E2 - \Delta E2E3}{2}\right)c$$

and determining the distance dMO''' of the second transceiver device (M) from the third sensing device (O''') using the following formula $$dMO''' = dEM + D''' + \left(\frac{\Delta O1'''O2''' - \Delta O2'''O3'''}{2} - \frac{\Delta E1E2 - \Delta E2E3}{2}\right)c$$

and determining the 3-dimensional spatial position of the second transceiver device (M) using the distances dEM, dMO', dMO'' and dMO'''.

12. Method according to claim 1, characterised by that the wave signals (l1, l2, v) are electromagnetic signals.

13. Method according to claim 12, characterised by that the electromagnetic signals are ultra-wideband radio signals and the centre frequency and bandwidth of the ultra-wideband radio signals is in the gigahertz range.

14. Method according to claim 1, characterised by that the first or second transceiver device (E, M) is a mobile communication device.

15. System for measuring distance using wave signals (l1, l2, v), which contains a first and second transceiver device (E, M) suitable for emitting and receiving wave signals (l1, l2, v), as well as sensing devices (O', O'', O''') suitable for receiving wave signals (l1, l2, v) arranged at a distance D', D'', D''' from one of the first and second transceiver devices (E, M), characterised by configuring the first and second transceiver devices (E, M), and the sensing devices (O', O'', O''') in a way suitable for implementing the method according to claims 1 to 14.

16. System according to claim 15, characterised by that it contains a central information technology unit (10) which is in a wired and/or wireless data connection with the first transceiver device (E), the second transceiver device (M) and the sensing devices (O', O'', O''').

* * * * *

UNITED STATES PATENT AND TRADEMARK OFFICE
CERTIFICATE OF CORRECTION

| | | |
|---|---|---|
| PATENT NO. | : 10,976,427 B2 | Page 1 of 1 |
| APPLICATION NO. | : 16/310315 | |
| DATED | : April 13, 2021 | |
| INVENTOR(S) | : Andras Balogh et al. | |

It is certified that error appears in the above-identified patent and that said Letters Patent is hereby corrected as shown below:

On the Title Page

Item (57) In the Abstract, page 2, Line 6, the term "(O', 0", O''')" should read -- (O', O", O''') --

In the Specification

Column 2, Line 34, the word "dearly" should be -- clearly --

In the Claims

Claim 7, Column 11, Line 32, "time interval $\Delta O1"O2'''$." should read -- time interval $\Delta O1'''O2'''$. --
Claim 7, Column 11, Line 39, "sensing device (O') at time O3''' following" should read -- sensing device (O''') at time O3''' following --
Claim 7, Column 11, Line 40, "time interval $\Delta O2'O3"$, and" should read -- time interval $\Delta O2'''O3'''$, and --
Claim 7, Column 11, Line 52, "third sensing device (O") using" should read -- third sensing device (O''') using --

Claim 11, Column 12, Line 61, "by the time interval $\Delta O1"O2'''$," should read -- by the time interval $\Delta O1'''O2'''$, --
Claim 11, Column 13, Line 1, "sensing device (O') at time O3''' following" should read -- sensing device (O''') at time O3''' following --
Claim 11, Column 13, Line 2, "time interval $\Delta O2'O3"$, and" should read -- time interval $\Delta O2'''O3'''$, and --

Signed and Sealed this
Thirty-first Day of May, 2022

*Katherine Kelly Vidal*
Katherine Kelly Vidal
*Director of the United States Patent and Trademark Office*